US012631915B2

(12) United States Patent
Bo et al.

(10) Patent No.: US 12,631,915 B2
(45) Date of Patent: May 19, 2026

(54) DISPLAY PANEL AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Lingdan Bo, Beijing (CN); Yingying Qu, Beijing (CN); Jianhua Huang, Beijing (CN); Dongchuan Chen, Beijing (CN); Pengyu Qi, Beijing (CN); Yue Yang, Beijing (CN); Hui Li, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 122 days.

(21) Appl. No.: 18/642,090

(22) Filed: Apr. 22, 2024

(65) Prior Publication Data

US 2024/0361631 A1 Oct. 31, 2024

Related U.S. Application Data

(63) Continuation of application No. PCT/CN2023/091058, filed on Apr. 27, 2023.

(51) Int. Cl.
G02F 1/1335 (2006.01)

(52) U.S. Cl.
CPC .. G02F 1/133502 (2013.01); G02F 1/133512 (2013.01); G02F 1/133528 (2013.01)

(58) Field of Classification Search
None
See application file for complete search history.

(56) References Cited

U.S. PATENT DOCUMENTS 6,157,426 A * 12/2000 Gu ................... G02F 1/133512
349/110
2002/0181109 A1 12/2002 Chu
2019/0064951 A1 2/2019 Yang
2020/0271984 A1 8/2020 Kudo et al.
(Continued)

FOREIGN PATENT DOCUMENTS

CN 103926743 A 7/2014
CN 105026963 A 11/2015
CN 106501882 A 3/2017
(Continued)

*Primary Examiner* — Phu Vu
(74) *Attorney, Agent, or Firm* — WHDA, LLP

(57) ABSTRACT

A display panel and a display device are provided by the present application. The display panel includes: a glass substrate, wherein the glass substrate is a substrate at the light exiting side of the display panel; and a tandem layer located at the light exiting side of the glass substrate. The tandem layer includes one or more first sub-layers and one or more second sub-layers, and the first sub-layers and the second sub-layers are arranged alternately. A refractive index of each of the first sub-layers and a refractive index of each of the second sub-layers are unequal. A thickness of each of the first sub-layers is less than a thickness of each of the second sub-layers. A visible-light reflectivity of the display panel is less than or equal to 1.1%. The display panel is used to manufacture low-reflectivity display products.

14 Claims, 4 Drawing Sheets

(56)           References Cited

U.S. PATENT DOCUMENTS

2024/0142668 A1      5/2024  Hart et al.

FOREIGN PATENT DOCUMENTS

| CN | 107272088 | A | * | 10/2017 | ............. G02B 1/116 |
| CN | 207067963 | U |   | 3/2018  |   |
| CN | 111094200 | A |   | 5/2020  |   |
| CN | 211956065 | U |   | 11/2020 |   |
| CN | 113641030 | A |   | 11/2021 |   |
| CN | 114371571 | A |   | 4/2022  |   |
| JP | 2013-114086 | A |  | 6/2013  |   |

* cited by examiner

| ITEM | | case1 | case2 | case3 | case4 | case5 | case6 | case7 | Glass | ITO 153 | ITO 140 |
|---|---|---|---|---|---|---|---|---|---|---|---|
| Refractive index @550nm | SiO2 | 1.48± 0.1 | ↓ | ↓ | ↓ | ↓ | ↓ | ↓ | / | / | / |
| | SiNx | 1.91± 0.1 | 1.91± 0.1 | 1.91± 0.1 | 2.04± 0.1 | 2.04± 0.1 | 1.91± 0.1 | 1.91± 0.1 | / | / | / |
| | ITO | 1.95± 0.1 | ↓ | ↓ | ↓ | ↓ | ↓ | ↓ | / | 1.95± 0.1 | ↓ |
| | Glass | 1.54± 0.1 | ↓ | ↓ | ↓ | ↓ | ↓ | ↓ | ↓ | ↓ | ↓ |
| Film thickness | ITO/nm | 16±1 | 16±1 | 14±1 | 16±1 | 14±1 | 15±1 | 16±1 | 0 | 16±1 | 14±1 |
| | SiO2/nm | 57±4 | 46.7±4 | 64.5±4 | 58±4 | 64±4 | 57±4 | 57±4 | 0 | 0 | 0 |
| | SiNx/nm | 30±2 | 35.9±2 | 26.5±2 | 22±2 | 22.5±2 | 30±2 | 30±2 | 0 | 0 | 0 |
| | SiO2/nm | 57±4 | 50.3±4 | 61.5±4 | 56±4 | 61±4 | 57±4 | 57±4 | 0 | 0 | 0 |
| | SiNx/nm | 14±1 | 18±1 | 12±1 | 10±1 | 12±1 | 20±1 | 30±1 | 0 | 0 | 0 |
| Actually measured reflectivity @550nm | | 8.5%± 0.2% | 9.15%± 0.2% | 8.12%± 0.2% | 8.36%± 0.2% | 7.9%± 0.2% | 8.63%± 0.2% | 9.6%± 0.2% | 8.5%± 0.2% | 9.47%± 0.2% | 9.46%± 0.2% |

FIG. 14

DISPLAY PANEL AND DISPLAY DEVICE

TECHNICAL FIELD

The present application relates to the technical field of displaying and, more particularly, to a display panel and a display device.

BACKGROUND

With the rapid development of the display industry and the updating of the display technique, consumers are increasingly focusing on the image quality of display products. Therefore, high-image-quality display products having a high resolution, a high transmittance, a high contrast, a high color gamut and so on have become the favorite products for increasingly more consumers.

Currently, when the resolution, the transmittance, the contrast and the color gamut satisfy the requirements, the reflectivity of the display products becomes an important factor for the improvement of the image quality of the display products. With a high reflectivity, when the display is watched in a scene with strong ambient light, the display face of the display very easily reflects the person or object facing the display face of the display, and the image reflected by the display face seriously interferes the displayed frame, the effect of displaying is reduced.

SUMMARY

The embodiments of the present application employ the following technical solutions:

In a first aspect, a display panel is provided by an embodiment of the present application, wherein the display panel includes:

a glass substrate, wherein the glass substrate is a substrate at a light exiting side of the display panel; and a tandem layer located at a light exiting side of the glass substrate;

the tandem layer includes one or more first sub-layers and one or more second sub-layers, and the first sub-layers and the second sub-layers are arranged alternately; a refractive index of each of the first sub-layers is greater than a refractive index of each of the second sub-layers; a thickness of each of the first sub-layers is less than a thickness of each of the second sub-layers;

wherein a visible-light reflectivity of the display panel is less than or equal to 1.1%.

In at least one embodiment of the present application, the refractive index of each of the first sub-layers is greater than a refractive index of the glass substrate, and the refractive index of each of the second sub-layers is less than the refractive index of the glass substrate.

In at least one embodiment of the present application, the display panel further includes a light-transmitting conducting layer, and the light-transmitting conducting layer is located at one side of the tandem layer that is further from the glass substrate; and a refractive index of the light-transmitting conducting layer is greater than the refractive index of each of the second sub-layers, and the refractive index of the light-transmitting conducting layer is greater than the refractive index of the glass substrate.

In at least one embodiment of the present application, a thickness of each of at least some of the first sub-layers is less than or equal to a thickness of the light-transmitting conducting layer.

In at least one embodiment of the present application, thicknesses of the second sub-layers are equal.

In at least one embodiment of the present application, a quantity of the first sub-layers and a quantity of the second sub-layers are equal, a quantity N of the first sub-layers is an even number, a first instance of the first sub-layers directly contacts the glass substrate, and an N-th instance of the second sub-layers directly contacts the light-transmitting conducting layer; and a minimum distance from a surface of an (N/2)-th instance of the second sub-layers that is further from the glass substrate to the glass substrate is less than a distance from the surface of the (N/2)-th instance of the second sub-layers that is further from the glass substrate to the light-transmitting conducting layer.

In at least one embodiment of the present application, a thickness of the first instance of the first sub-layers is less than a thickness of each of the other instances of the first sub-layers.

In at least one embodiment of the present application, the tandem layer includes two instances of the first sub-layers and two instances of the second sub-layers, and an absolute value of a difference between two times a thickness of the first instance of the first sub-layers and a thickness of a second instance of the first sub-layers is less than or equal to 4 nm.

In at least one embodiment of the present application, an absolute value of a difference between a thickness of the first instance of the first sub-layers and a thickness of the light-transmitting conducting layer is less than or equal to 6 nm.

In at least one embodiment of the present application, absolute values of differences between thicknesses of the second sub-layers are less than or equal to 12 nm.

In at least one embodiment of the present application, a range of the refractive index of each of the first sub-layers is 1.8-2.2; a range of the refractive index of each of the second sub-layers is 1.4-1.6; and a material of the first sub-layers includes a nitride of silicon, and a material of the second sub-layers includes an oxide of silicon.

In at least one embodiment of the present application, the display panel further includes a composite polarizing film, and the composite polarizing film is located at one side of the light-transmitting conducting layer that is further from the tandem layer; and the composite polarizing film includes a polarizer and a low-reflection layer, and the low-reflection layer is located at one side of the polarizer that is further from the light-transmitting conducting layer.

In at least one embodiment of the present application, a ratio of a refractive index of air to a refractive index of the low-reflection layer is substantially equal to a ratio of the refractive index of the low-reflection layer to a refractive index of the polarizer.

In at least one embodiment of the present application, a range of a refractive index of the composite polarizing film is 1.2-1.4.

In at least one embodiment of the present application, the display panel further includes a color-resistor layer, the color-resistor layer is located at one side of the glass substrate that is further from the tandem layer, the color-resistor layer includes a black matrix pattern, and a refractive index of the black matrix pattern is less than or equal to 1.7.

In a second aspect, a display device is provided by an embodiment of the present application, wherein the display device includes the display panel described above.

The above description is merely a summary of the technical solutions of the present application. In order to more clearly know the technical means of the present application to enable the implementation according to the contents of the description, and in order to make the above and other purposes, features and advantages of the present application more apparent and understandable, the specific embodiments of the present application are provided below.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are merely embodiments of the present application, and a person skilled in the art can obtain other figures according to these figures without paying creative work.

FIG. 14 is a diagram of the list of the result of the measurements on the structural parameters and the reflectivities of ten film-layer structures according to embodiments of the present application.

DETAILED DESCRIPTION

Figures 1, 2, 3, 4, 5:
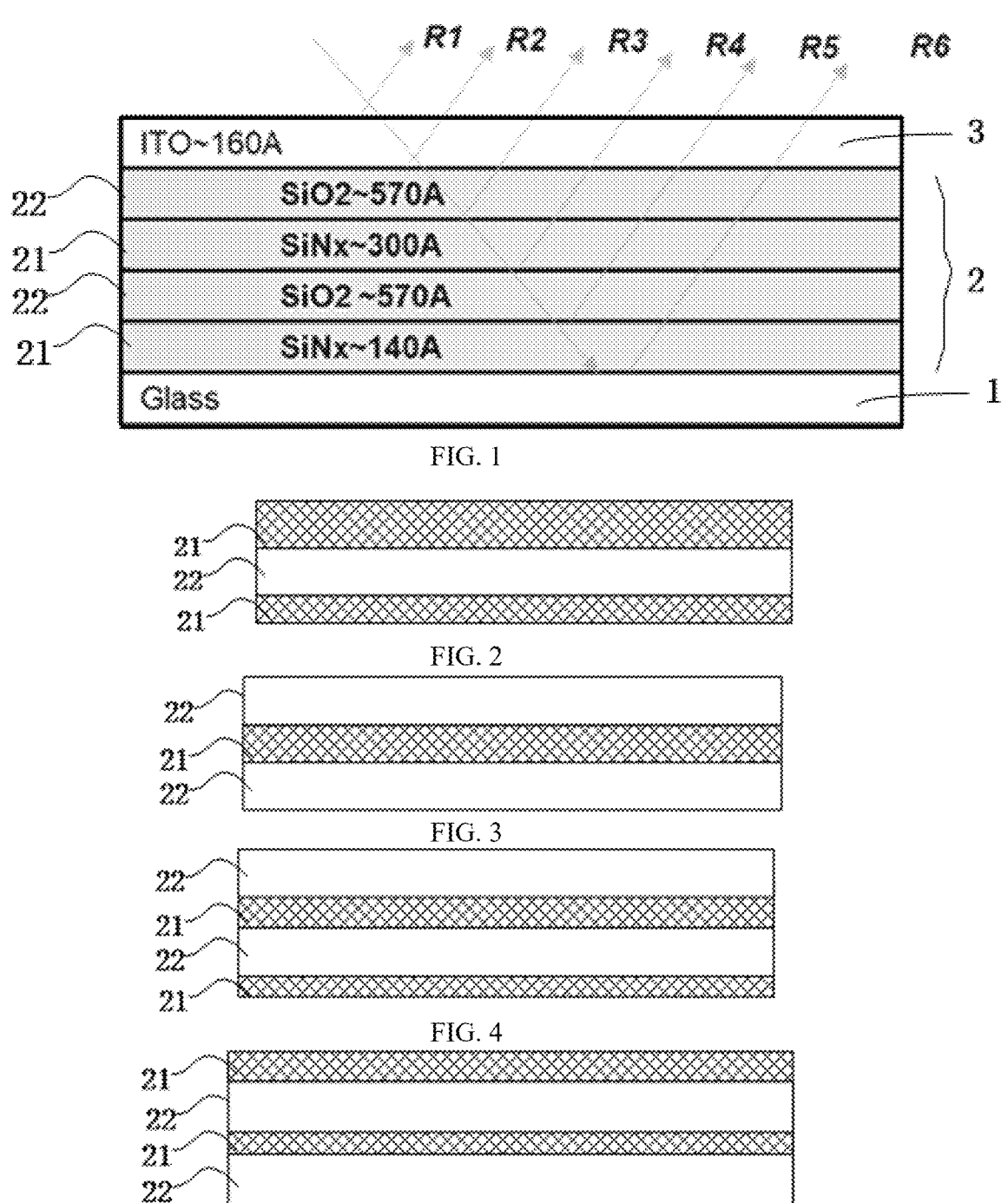
FIG. 1 is a schematic diagram of a local film-layer structure of a display panel according to an embodiment of the present application.
FIGS. 2-8 are schematic structural diagrams of a tandem layer according to embodiments of the present application.

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the drawings, in order for clarity, the thicknesses of the regions and the layers might be exaggerated. In the drawings, the same reference numbers represent the same or similar components, and therefore the detailed description on them are omitted. Moreover, the drawings are merely schematic illustrations of the present application, and are not necessarily drawn to scale.

In the embodiments of the present application, terms such as "first", "second", "third" and "fourth" are used to distinguish identical items or similar items that have substantially the same functions and effects, merely in order to clearly describe the technical solutions of the embodiments of the present application, and should not be construed as indicating or implying the degrees of importance or implicitly indicating the quantity of the specified technical features.

In the embodiments of the present application, the terms that indicate orientation or position relations, such as "upper" and "lower", are based on the orientation or position relations shown in the drawings, and are merely for conveniently describing the present application and simplifying the description, rather than indicating or implying that the device or element must have the specific orientation and be constructed and operated according to the specific orientation. Therefore, they should not be construed as a limitation on the present application.

In the description of the present disclosure, the terms "one embodiment", "some embodiments", "exemplary embodiment", "example", "specific example" or "some examples" are intended to indicate that specific features, structures, materials or characteristics related to the embodiment or example are included in at least one embodiment or example of the present application. The illustrative indication of the above terms does not necessarily refer to the same embodiment or example. Moreover, the specific features, structures, materials or characteristics may be included in any one or more embodiments or examples in any suitable manner.

In the embodiments of the present application, the meaning of "plurality of" is "two or more", and the meaning of "at least one" is "one or more", unless explicitly and particularly defined otherwise.

All of the features used in the embodiments of the present application of "parallel", "perpendicular", "the same" and so on include the features of "parallel", "perpendicular", "the same" and so on in the strict sense, and include the cases in which there is a certain tolerance such as "substantially parallel", "substantially perpendicular" and "substantially the same", taking into consideration the measurement and the tolerances relevant to the measurement on particular quantities (for example, restricted by the measuring system), and represent that they are in the acceptable deviation ranges of the particular values determined by a person skilled in the art. For example, the "substantially" can represent that they are within one or more standard deviations, or within 10% or 5% of the values.

Unless stated otherwise in the context, throughout the description and the claims, the term "include" is interpreted as the meaning of opened containing, i.e., "including but not limited to".

The "same layer" according to the embodiments of the present application refers to the relation between multiple film layers that are formed by using the same material after the same step (for example, a one-step patterning step). The "same layer" used herein does not always refer to that the thickness of a plurality of film layers are equal or that the heights in a cross-sectional view of a plurality of film layers are equal. The polygons in the description are not the strictly defined polygons, may be an approximate triangle, parallelogram, trapezoid, pentagon, hexagon and so on, and may have some small deformations caused by tolerance.

With the continuous development of the display industry and the updating of the display technique, consumers are increasingly focusing on the display image quality. High-image-quality display products having a high resolution, a high transmittance, a high contrast, a high color gamut and so on have become the favorite products for increasingly more consumers. Under the promise of meeting basic performance requirements, the improvement on the image quality is a long-term aim, and an extremely black image-quality display has been a hotspot in recent years. The "extremely black" is embodied as the anti-reflection function of the display panels. If the reflection ability of a display panel to the external lights is weaker, the effect of watching under intensive lights is better. Especially, under a black frame, if the reflection ability is weaker, the interference of the black frame by the outside light is less, so as to realize an "extremely black" effect of display.

Based on this, a display panel is provided by an embodiment of the present application. By configuring that the tandem layer is disposed at the light exiting side of the glass substrate of the display panel, the tandem layer includes one or more first sub-layers and one or more second sub-layers, and the first sub-layers and the second sub-layers are arranged alternately; a refractive index of each of the first sub-layers is greater than a refractive index of each of the second sub-layers; and a thickness of each of the first sub-layers is less than a thickness of each of the second sub-layers, accordingly, the display panel has an extremely low reflectivity, wherein a visible-light reflectivity of the display panel is less than or equal to 1.1%, thus an "extremely black" effect of display can be realized.

The display panel according to the embodiments of the present application will be specifically described below with reference to the drawings.

A display panel is provided by an embodiment of the present application. As shown in FIG. 1, the display panel includes: a glass substrate 1, wherein the glass substrate 1 is a substrate at the light exiting side of the display panel; and a tandem layer 2 located at the light exiting side of the glass substrate 1. FIG. 1 merely illustrates a part of the film-layer structure of the display panel.

As shown in FIGS. 2-9, the tandem layer 2 includes one or more first sub-layers 21 and one or more second sub-layers 22, and the first sub-layers 21 and the second sub-layers 22 are arranged alternately. The refractive index of each of the first sub-layers 21 is greater than the refractive index of each of the second sub-layers 22. The thickness of each of the first sub-layers 21 is less than the thickness of each of the second sub-layers 22.

The visible-light reflectivity of the display panel is less than or equal to 1.1%.

In an exemplary embodiment, the display panel stated above may be a liquid-crystal display panel (LCD), and the liquid-crystal display panel may be liquid-crystal display panels such as the TN (twisted nematic) type, the VA (vertical alignment) type, the IPS (in-plane switching) type and the ADS (advanced super dimension switch) type.

The liquid-crystal display panel may include a color-film base board and an array base board that face each other, and may further include a liquid-crystal layer located between the color-film base board and the array base board. Certainly, the liquid-crystal display panel may further include other components such as a driving circuit.

The color-film base board is the base board at the light exiting side of the liquid-crystal display panel, both of the color-film base board and the array base board include a glass substrate, the glass substrate of the array base board is the substrate at the light entering side of the liquid-crystal display panel, and the glass substrate of the color-film base board is the substrate at the light exiting side of the liquid-crystal display panel. In other words, the light rays emitted by the backlight source of the liquid-crystal display panel firstly pass through the glass substrate of the array base board, enter the liquid-crystal display panel, subsequently sequentially pass through the array base board, the liquid-crystal layer and the color-film base board, and exit from the glass substrate of the color-film base board. The glass substrate 1 according to the embodiments of the present application refers to the glass substrate of the color-film base board.

As an example, a material of the glass substrate 1 is an optical glass.

As an example, the thickness of the glass substrate 1 may be approximately 0.5 mm, approximately 1 mm, approximately 1.2-1.5 mm or approximately 2 mm. The specific thickness may be decided according to the product design, and is not limited herein.

As an example, the tandem layer 2 includes one or more first sub-layers 21 and one or more second sub-layers 22. In other words, the tandem layer 2 includes at least two sub-layers.

It is not limited herein whether the quantity of the first sub-layers 21 and the quantity of the second sub-layers 22 included by the tandem layer 2 are equal.

As an example, as shown in FIGS. 4 and 5, the quantity of the first sub-layers 21 may be equal to the quantity of the second sub-layers 22.

Figures 6, 7, 8, 9, 10:
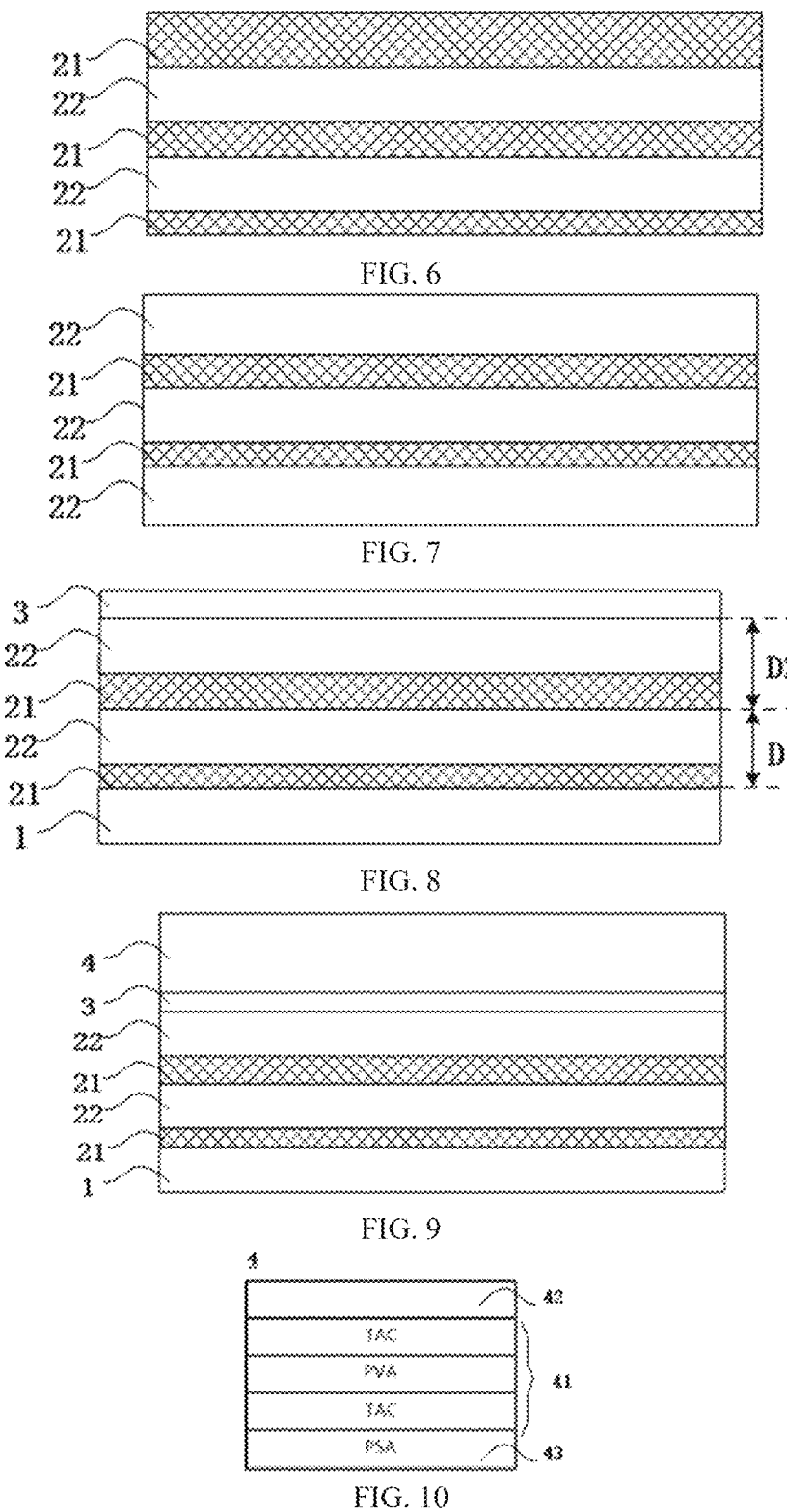
FIG. 9 is a schematic diagram of a local film-layer structure of another display panel according to an embodiment of the present application.
FIG. 10 is a schematic structural diagram of a composite polarizing film according to an embodiment of the present application.

As an example, as shown in FIGS. 2 and 6, the quantity of the first sub-layers 21 may be greater than the quantity of the second sub-layers 22.

As an example, as shown in FIGS. 3 and 7, the quantity of the first sub-layers 21 may be less than the quantity of the second sub-layers 22.

For example, the tandem layer 2 includes three first sub-layers 21 and two second sub-layers 22.

As another example, the tandem layer 2 includes two first sub-layers 21 and two second sub-layers 22.

As another example, the tandem layer 2 may include two first sub-layers 21 and three second sub-layers 22.

As another example, the tandem layer 2 includes one first sub-layer 21 and two second sub-layers 22.

It should be noted that, in practical applications, if the quantity of the sub-layers included by the tandem layer 2 is higher, the effect of refraction of the interfaces is more significant, and the effect of reducing the reflection is better. However, taking into consideration the factors of the restriction by the difficulty in the manufacturing process and that an excessively large thickness reduces the light weight and the aesthetic degree of the display panel, it may be configured that the range of the quantity of the sub-layers included by the tandem layer 2 is 3-8.

In an exemplary embodiment, the tandem layer 2 stated above includes two types of light-transmitting materials. Exemplary light-transmitting materials may include an organic light-transmitting material and/or an inorganic light-transmitting material.

The thickness of the tandem layer 2 stated above is not limited herein. When the thicknesses of the first sub-layers 21 and the second sub-layers are decided, the thickness of the tandem layer 2 may be decided according to the quantity of the sub-layers included by the tandem layer 2.

In an exemplary embodiment, if the tandem layer 2 includes a plurality of first sub-layers 21 and a plurality of second sub-layers 22, it is not limited herein whether the thicknesses of the plurality of first sub-layers 21 are equal or whether the thicknesses of the plurality of second sub-layers 22 are equal, wherein "plurality of" refers to "at least two".

As an example, the thicknesses of some of the first sub-layers 21 are equal, and the thicknesses of some of the first sub-layers 21 are unequal. As an example, the thicknesses of all of the first sub-layers 21 are unequal. As an example, the thicknesses of all of the second sub-layers 21 are equal.

As an example, the thicknesses of some of the second sub-layers 22 are equal, and the thicknesses of some of the second sub-layers 22 are unequal. As an example, the thicknesses of all of the second sub-layers 22 are unequal. As an example, the thicknesses of all of the second sub-layers 22 are equal.

In an exemplary embodiment, the refractive index of each of the first sub-layers 21 is greater than the refractive index of each of the second sub-layers 22, the thickness of each of the first sub-layers 21 is less than the thickness of each of the second sub-layers 22. In other words, the sub-layer having a higher refractive index is configured to have a lower thickness.

That the thickness of each of the first sub-layers 21 is less than the thickness of each of the second sub-layers 22 refers to that the thickness of each of the first sub-layers 21 is less than the thickness of any one of the second sub-layers 22.

The visible-light reflectivity of the display panel is less than or equal to 1.1%. The visible-light reflectivity refers to the proportion of the light rays that are reflected out by the display panel in the total amount of the external light rays irradiating the display panel.

As an example, the visible-light reflectivity of the display panel is less than or equal to 1.0%. For example, the visible-light reflectivity of the display panel may be 0.99%, 0.98%, 0.97%, 0.96%, 0.95%, 0.93%, 0.92%, 0.90%, 0.88% or 0.85%.

In the display panel according to the embodiments of the present application, the tandem layer 2 is disposed at the light exiting side of the glass substrate 1 of the display panel, the tandem layer 2 includes one or more first sub-layers 21 and one or more second sub-layers 22, and the first sub-layers 21 and the second sub-layers 22 are arranged alternately; the refractive index of each of the first sub-layers 21 is greater than the refractive index of each of the second sub-layers 22; and the thickness of each of the first sub-layers 21 is less than the thickness of each of the second sub-layers 22. Accordingly, the external light rays are refracted and scattered at the interfaces between the first sub-layers 21 and the second sub-layers 22, which reduces the probability of reflection happens, thereby the exiting amount of the reflected light rays is reduced, so that the display panel has an extremely low reflectivity, wherein the visible-light reflectivity of the display panel is less than or equal to 1.1%, thus an "extremely black" effect of displaying is realized.

In at least one embodiment of the present application, as shown in FIG. 1, the refractive index of each of the first sub-layers 21 is greater than the refractive index of the glass substrate 1, and the refractive index of each of the second sub-layers 22 is less than the refractive index of the glass substrate 1.

In other words, the refractive index of each of the second sub-layers 22 is less than the refractive index of the glass substrate 1, and the refractive index of the glass substrate 1 is less than the refractive index of each of the first sub-layers 21. In other words, the refractive index of the glass substrate 1 is between the refractive indexes of the first sub-layers 21 and the second sub-layers 22.

In at least one embodiment of the present application, as shown in FIG. 9, the display panel further includes a light-transmitting conducting layer 3, and the light-transmitting conducting layer 3 is located at the side of the tandem layer 2 that is further from the glass substrate 1.

The refractive index of the light-transmitting conducting layer 3 is greater than the refractive index of each of the second sub-layers 22, and the refractive index of the light-transmitting conducting layer 3 is greater than the refractive index of the glass substrate 1.

In an exemplary embodiment, the material of the light-transmitting conducting layer 3 may include a metal oxide, for example, indium tin oxide (ITO) or indium zinc oxide (IZO).

In the transportation process of the display panel or when the protecting film of the display panel is being ripped off, static electricity is generated very easily, and the static electricity may damage the components of the display panel. By disposing the light-transmitting conducting layer 3 at the side of the tandem layer 2 that is further from the glass substrate 1, the static electricity at the display panel can be released to a large extent, to reduce the probability that the display panel is damaged by the static electricity.

In some embodiments, the refractive index of the light-transmitting conducting layer 3 is substantially equal to the refractive index of each of the first sub-layers 21. The "substantially equal to" refers to that the absolute value of the difference between the refractive indexes of the light-transmitting conducting layer 3 and the first sub-layers 21 is less than or equal to 0.25. For example, the absolute value of the difference between the refractive indexes of the light-transmitting conducting layer 3 and the first sub-layers 21 is 0.02, 0.04, 0.1, 0.05, 0.2 or 0.25.

In some embodiments, the refractive index of the light-transmitting conducting layer 3 is less than the refractive index of each of the first sub-layers 21.

In the embodiments of the present application, by configuring that the refractive index of the light-transmitting conducting layer 3 is greater than the refractive index of each of the second sub-layers 22, and the refractive index of the light-transmitting conducting layer 3 is greater than the refractive index of the glass substrate 1, the refractive index of the light-transmitting conducting layer 3 is less than the refractive index of each of the first sub-layers 21, which reduces the probability that reflection happens, thereby the exiting amount of the reflected light rays is reduced, so that the display panel has an extremely low reflectivity, wherein the visible-light reflectivity of the display panel is less than or equal to 1.1%, thus an "extremely black" effect of displaying can be realized.

It should be noted that, in the data of the refractive indexes of the tandem layer 2, the light-transmitting conducting layer 3 and the glass substrate 1 according to the embodiments of the present application, all of the refractive indexes refer to the data of the refractive indexes when the wavelength is 550 nm.

The principle of reducing the reflectivity of the tandem layer 1 will be described below by taking the structure of the display panel shown in FIG. 1 as an example. FIG. 1 is illustrated by taking the case as an example in which the thickness of the first first sub-layer 21 is 140 Å, the thickness of the first second sub-layer 22 is 570 Å, the thickness of the second first sub-layer 21 is 300 Å, and the thickness of the second second sub-layer 22 is 570 Å.

When the external light rays are irradiating the display panel, the light ray that is reflected by the surface of the light-transmitting conducting layer 3 is R1, the light ray that is reflected by the interface between the second second sub-layer 22 and the light-transmitting conducting layer 3 is R2, the light ray that is reflected by the interface between the second first sub-layer 21 and the second second sub-layer 22 is R3, the light ray that is reflected by the interface between the first second sub-layer 22 and the second first sub-layer 21 is R4, the light ray that is reflected by the interface between the first first sub-layer 21 and the first second sub-layer 22 is R5, and the light ray that is reflected by the interface between the glass substrate 1 and the first first sub-layer 21 is R6. In an aspect, by configuring the tandem layer 2, the refraction and the scattering between the film layers are increased, which reduces the total amount of the reflected light rays. In another aspect, by configuring the relations of the refractive indexes of the first sub-layers 21, the second sub-layers 22, the glass substrate 1 and the light-transmitting conducting layer 3, and configuring the relations of the thicknesses of the first sub-layers 21 and the second sub-layers 22, at least some of the reflected light rays R1, R2, R3, R4, R5 and R6 have equal amplitudes, a phase difference of half of the wavelength, and equal light intensities, a part of the light rays have the offsetting effect (in other words, interference offsetting occurs in light waves), thereby the exiting amount of the reflected light rays is further reduced and the reflectivity of the display panel is reduced.

In at least one embodiment of the present application, as shown in FIGS. 2, 4 and 5-8, the thickness of each of at least some of the first sub-layers 21 is less than or equal to the thickness of the light-transmitting conducting layer 3.

That the thickness of each of at least some of the first sub-layers 21 is less than or equal to the thickness of the light-transmitting conducting layer 3 includes but is not limited to the following cases:

In a first case, the thickness of each of some of the first sub-layers 21 is less than or equal to the thickness of the light-transmitting conducting layer 3.

For example, the thickness of each of some of the first sub-layers 21 is less than the thickness of the light-transmitting conducting layer 3, and the thickness of each of some of the first sub-layers 21 is substantially equal to the thickness of the light-transmitting conducting layer 3.

As another example, the thickness of each of some of the first sub-layers 21 is less than the thickness of the light-transmitting conducting layer 3, and the thickness of each of some of the first sub-layers 21 is greater than the thickness of the light-transmitting conducting layer 3.

As another example, the thickness of each of some of the first sub-layers 21 is substantially equal to the thickness of the light-transmitting conducting layer 3, and the thickness of each of some of the first sub-layers 21 is greater than the thickness of the light-transmitting conducting layer 3.

In a second case, the thickness of each of all of the first sub-layers 21 is less than or equal to the thickness of the light-transmitting conducting layer 3.

In at least one embodiment of the present application, the thicknesses of the second sub-layers 22 are equal.

In at least one embodiment of the present application, the quantity of the first sub-layers 21 and the quantity of the second sub-layers 22 are equal, a quantity N of the first sub-layers is an even number, the first first sub-layer 21 directly contacts the glass substrate 1, and the N-th second sub-layer 22 directly contacts the light-transmitting conducting layer 3. The minimum distance from the surface of the (N/2)-th second sub-layer 22 that is further from the glass substrate 1 to the glass substrate 1 is less than the distance from the surface of the (N/2)-th second sub-layer 22 that is further from the glass substrate 1 to the light-transmitting conducting layer 3.

As an example, as shown in FIG. 8, the quantity of the first sub-layers 21 and the quantity of the second sub-layers 22 are equal, the quantity of the first sub-layers is 2, the first first sub-layer 21 directly contacts the glass substrate 1, and the second second sub-layer 22 directly contacts the light-transmitting conducting layer 3. The minimum distance D1 from the surface of the first second sub-layer 22 that is further from the glass substrate 1 to the glass substrate 1 is less than the distance D2 from the surface of the first second sub-layer 22 that is further from the glass substrate 1 to the light-transmitting conducting layer 3.

As an example, as shown in FIG. 8, the quantity of the first sub-layers 21 and the quantity of the second sub-layers 22 are equal, the quantity of the first sub-layers is 2. As shown by the parameters in case1 to case6 in FIG. 14, the thickness of the first first sub-layer 21 is less than two times the thickness of the light-transmitting conducting layer 3.

Further, as shown by the parameters in case1 and case3 to case5 in FIG. 14, the thickness of the first first sub-layer 21 is less than or equal to the thickness of the light-transmitting conducting layer 3.

As an example, the range of the thickness of the first first sub-layer 21 may be configured to be 9-22 nm. For example, the thickness of the first first sub-layer 21 is configured to be 10 nm, 11 nm, 12 nm, 13 nm, 14 nm, 15 nm, 16 nm, 17 nm, 18 nm, 19 nm, 20 nm or 21 nm.

In the embodiments of the present application, by configuring that the minimum distance from the surface of the (N/2)-th second sub-layer 22 that is further from the glass substrate 1 to the glass substrate 1 is less than the distance from the surface of the (N/2)-th second sub-layer 22 that is further from the glass substrate 1 to the light-transmitting conducting layer 3, and the thickness of the first first sub-layer 21 is less than the thickness of each of the other first sub-layers 21. Accordingly, the light rays can be further facilitated have the offsetting effect (in other words, interference offsetting occurs in light waves), thereby the exiting amount of the reflected light rays is further reduced and the visible-light reflectivity of the display panel is reduced.

In at least one embodiment of the present application, the tandem layer 2 includes two first sub-layers 21 and two second sub-layers 22, and the absolute value of the difference between two times the thickness of the first first sub-layer 21 and the thickness of the second first sub-layer 21 is less than or equal to 4 nm.

As an example, as shown by the parameters in case1 to case6 in FIG. 14, the thickness of the first first sub-layer 21 may be configured to be 14±1 nm, 18.2±1 nm, 12±1 nm, 10±1 nm, 12±1 nm or 20±1 nm.

As an example, as shown by the parameters in case1 to case6 in FIG. 14, the thickness of the second first sub-layer 21 may be configured to be 30±2 nm, 35.9±2 nm, 26.5±2 nm, 22±2 nm, 22.5±2 nm or 30±2 nm. For example, the thickness of the second first sub-layer 21 is configured to be 30±1 nm, 35.9±1 nm, 26.5±1 nm, 22±12 nm, 22.5±1 nm or 30±1 nm.

As an example, the absolute value of the difference between two times the thickness of the first first sub-layer 21 and the thickness of the second first sub-layer 21 is less than or equal to 4 nm, 3.5 nm, 3 nm, 2.5 nm, 2 nm, 1.5 nm, 1 nm, 0.5 nm or 0 nm.

FIG. 14 is illustrated by taking the case as an example in which the materials of the first sub-layers 21 are silicon nitride ($SiN_x$) and the materials of the second sub-layers 22 are silicon oxide ($SiO_2$).

In at least one embodiment of the present application, as shown by the parameters in case1 to case6 in FIG. 14, the absolute value of the difference between the thickness of the first first sub-layer 21 and the thickness of the light-transmitting conducting layer 3 is less than or equal to 6 nm.

As an example, as shown by the parameters in case1 to case6 in FIG. 14, the range of the thickness of the light-transmitting conducting layer 3 may be configured to be 13-17 nm, for example, 14 nm, 15 nm, 16 nm.

As an example, the absolute value of the difference between the thickness of the first first sub-layer 21 and the thickness of the light-transmitting conducting layer 3 is less than or equal to 6 nm, 5.5 nm, 5 nm, 4.5 nm, 4 nm, 3.5 nm, 3 nm, 2.5 nm, 2 nm, 1.5 nm, 1 nm, 0.5 nm or 0 nm.

In at least one embodiment of the present application, the absolute values of the differences between the thicknesses of the second sub-layers 22 are less than or equal to 12 nm.

As an example, the absolute values of the differences between the thicknesses of the second sub-layers 22 are less than or equal to 12 nm, 11 nm, 10 nm, 9 nm, 8 nm, 7 nm, 6 nm, 5 nm, 4 nm, 3 nm, 2 nm, 1 nm or 0 nm.

In at least one embodiment of the present application, the range of the refractive index of each of the first sub-layers 21 is 1.8-2.2. The range of the refractive index of each of the second sub-layers 22 is 1.4-1.6. The material of the first sub-layers 21 includes a nitride of silicon, and the material of the second sub-layers 22 includes an oxide of silicon.

It should be noted that all of the above-described refractive indexes of the first sub-layers 21 and the second sub-layers 22 refer to the data of the refractive indexes under the wavelength of 550 nm. In practical applications, according to the fluctuation in the measurement process of the measurement device, the difference in the film quality in the film formation of the first sub-layers 21 and the second sub-layers 22, the difference in the proportions of the silicon element and the nitrogen element in the nitride of silicon, and the difference in the proportions of the silicon element and the oxygen clement, it may be controlled that the range of the refractive index of each of the first sub-layers 21 is 1.8-2.2, and the range of the refractive index of each of the second sub-layers 22 is 1.4-1.6. Accordingly, by combining with the alternate arrangement of the first sub-layers 21 and the second sub-layers 22 configured above, and by configuring the relations of the thicknesses of the film layers, the display panel whose visible-light reflectivity is less than 1.1% can be obtained.

It should also be noted that FIG. 14 provides the data of the reflectivities that are measured under the different thicknesses of the film layers. For example, the data of the reflectivities of case1 to case7 are obtained by measuring under a simple structure of the glass substrate/the tandem layer/the light-transmitting conducting layer (ITO). The reflectivities of the column of Glass are the reflectivities when merely the reflectivity of the glass substrate is measured. The reflectivities of the columns of ITO153 and ITO140 are the reflectivities when merely the reflectivity of the light-transmitting conducting layer is measured.

In at least one embodiment of the present application, as shown in FIG. 9, the display panel further includes a composite polarizing film 4, and the composite polarizing film 4 is located at the side of the light-transmitting conducting layer 3 that is further from the tandem layer 2.

As shown in FIG. 10, the composite polarizing film 4 includes a polarizer 41 and a low-reflection layer 42, and the low-reflection layer 42 is located at the side of the polarizer 41 that is further from the light-transmitting conducting layer 3.

In the embodiments of the present application, by configuring that the composite polarizing film 4 includes a polarizer 41 and a low-reflection layer 42, the reflectivity of the polarizer can be further reduced and the visible-light reflectivity of the display panel is further reduced.

As an example, the composite polarizing film 4 further includes an adhesively bonding layer 43, and the material of the adhesively bonding layer 43 may include a pressure-sensitive adhesive (PSA).

Figure 13:
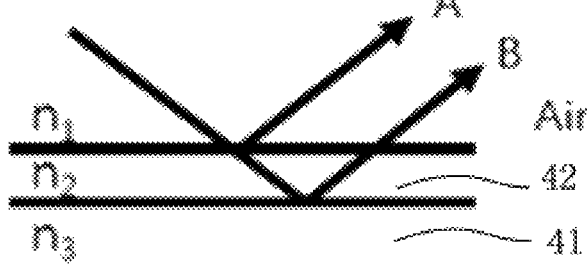
FIG. 13 is a diagram illustrating the principle of the light reflection by a composite polarizing film according to an embodiment of the present application.

In at least one embodiment of the present application, as shown in FIG. 13, a ratio of a refractive index n1 of air to a refractive index n2 of the low-reflection layer 42 is substantially equal to a ratio of the refractive index n2 of the low-reflection layer 42 to a refractive index n3 of the polarizer 41; in other words, $n1/n2{\approx}n2/n3$.

That the ratio of the refractive index n1 of air to the refractive index n2 of the low-reflection layer 42 is substantially equal to the ratio of the refractive index n2 of the low-reflection layer 42 to the refractive index n3 of the polarizer 41 includes but is not limited to the following cases:

In a first case, the ratio of the refractive index n1 of air to the refractive index n2 of the low-reflection layer 42 is equal to the ratio of the refractive index n2 of the low-reflection layer 42 to the refractive index n3 of the polarizer 41.

In a second case, the difference between the ratio of the refractive index n1 of air to the refractive index n2 of the low-reflection layer 42 and the ratio of the refractive index n2 of the low-reflection layer 42 to the refractive index n3 of the polarizer 41 is less than or equal to 5% of the ratio of the refractive index n1 of air to the refractive index n2 of the low-reflection layer 42.

For example, the difference is less than or equal to 5%, 4%, 3%, 2% or 1% of the ratio of the refractive index n1 of air to the refractive index n2 of the low-reflection layer 42.

In a third case, the difference between the ratio of the refractive index n1 of air to the refractive index n2 of the low-reflection layer 42 and the ratio of the refractive index n2 of the low-reflection layer 42 to the refractive index n3 of the polarizer 41 is less than or equal to 5% of the ratio of the refractive index n2 of the low-reflection layer 42 to the refractive index n3 of the polarizer 41.

For example, the difference is less than or equal to 5%, 4%, 3%, 2% or 1% of the ratio of the refractive index n2 of the low-reflection layer 42 to the refractive index n3 of the polarizer 41.

As an example, because $n1/n2{\approx}n2/n3$ and n1=1, $(n2)^2{\approx}n1{*}n3{\approx}n3$.

As an example, the polarizer 41 includes a polarizing element PVA and protecting layers TAC located at the two sides of the polarizing element PVA. The PVA is polyvinyl alcohol, and the TACs are thin films of triacetate fibers.

In at least one embodiment of the present application, the range of the refractive index of the composite polarizing film 4 is 1.2-1.4.

As an example, the refractive index of the composite polarizing film 4 may be 1.25, 1.3 or 1.35.

As an example, by disposing the low-reflection layer 42, the refractive index of the composite polarizing film 4 can be reduced, thereby the reflection between the light-transmitting conducting layer 3 and the composite polarizing film 4 shown in FIG. 9 is reduced, to further reduce the visible-light reflectivity of the display panel.

The principle of reducing the reflectivity of the display panel by the composite polarizing film 4 will be described below with reference to FIG. 13. The light ray A is the light ray that is reflected by the interface between air and the low-reflection layer 42, and the light ray B is the light ray that is reflected by the interface between the low-reflection layer 42 and the polarizer 41. When the reflected-out lights A and B have equal amplitudes, equal light intensities and a phase difference of half of the wavelength, the reflected-out lights are offset, thereby the goal of reducing the reflectivity is achieved.

Figure 12:
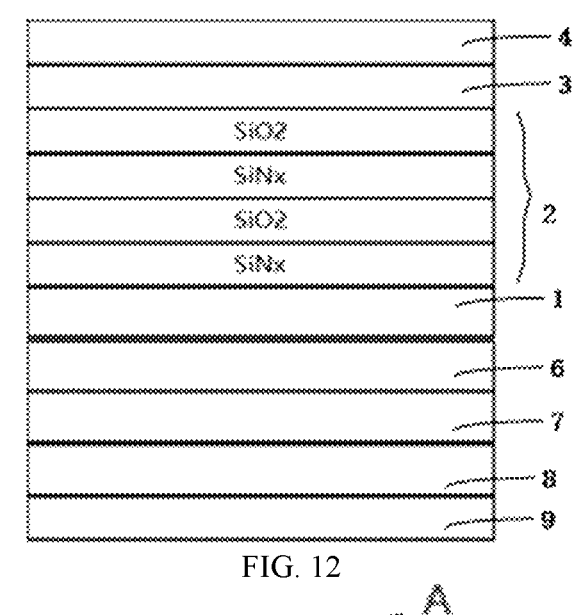
FIG. 12 is a schematic diagram of a local film-layer structure of yet another display panel according to an embodiment of the present application.

In at least one embodiment of the present application, as shown in FIG. 12, the display panel further includes a color-resistor layer 6, the color-resistor layer 6 is located at the side of the glass substrate 1 that is further from the tandem layer 2, the color-resistor layer 6 includes a black matrix pattern BM, and the refractive index of the black matrix pattern BM is less than or equal to 1.7.

As an example, a visible-light reflectivity of the black matrix pattern is less than or equal to 4.9%.

As an example, a visible-light reflectivity of the black matrix pattern is less than or equal to 4.7%.

The visible-light reflectivity of the black matrix pattern refers to the visible-light reflectivity that is obtained by measuring after the black matrix pattern are manufactured on the glass substrate 1.

As an example, a content of carbon black in a material of the black matrix pattern is less than or equal to 80% of a total amount of the material, and a thickness of the black matrix pattern is greater than or equal to 1.5 μm.

As an example, the material of the black matrix pattern includes carbon black, a resin and a low-refractive-index additive. The low-refractive-index additive may include a micro nanometer microsphere, a microsphere with a hollow structure, and a microsphere having pits or gaps at the surface. By adding the refractive-index additive, the scattering to light rays by the black matrix pattern can be increased, thereby the visible-light reflectivity of the black matrix pattern is reduced.

In an exemplary embodiment, as shown in FIG. 12, the display panel further includes a light-entering-side polarizer 9, a light-entering-side substrate 8 and a liquid-crystal layer 7. Certainly, the display panel further includes other structures and components, merely the components that are relevant to the inventiveness are introduced herein, and the other components included by the display panel may be obtained according to the prior art or common knowledge, and are not discussed further herein.

Figure 11:
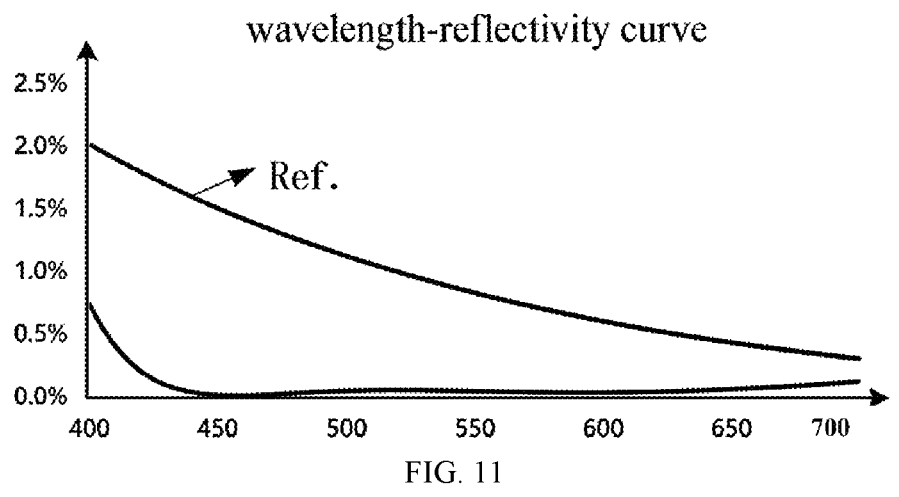
FIG. 11 is curves of the visible-light reflectivities of a display panel according to an embodiment of the present application and a display panel in the related art.

FIG. 11 provides a curve of the visible-light reflectivity of a display panel in the related art (marked with Ref.) and a curve of the visible-light reflectivity of the display panel according to the embodiments of the present application. Obviously, the reflectivity of the display panel according to the embodiments of the present application is significantly reduced.

A display device is provided by an embodiment of the present application, wherein the display device includes the display panel described above.

The specific structure of the display panel may be referred to the above description, and is not discussed further herein.

The display device may be a liquid-crystal display device, and the liquid-crystal display device may be liquid-crystal display devices such as the TN (twisted nematic) type, the VA (vertical alignment) type, the IPS (in-plane switching) type and the ADS (advanced super dimension switch) type.

The display device may be a display device such as an LCD display, and any product or component having the function of displaying and including the display device, such as a television set, a digital camera, a mobile phone and a tablet personal computer.

In the display device according to the embodiments of the present application, the tandem layer 2 is provided at the light exiting side of the glass substrate 1 of the display panel, the tandem layer 2 includes one or more first sub-layers 21 and one or more second sub-layers 22, and the first sub-layers 21 and the second sub-layers 22 are arranged alternately; the refractive index of each of the first sub-layers 21 is greater than the refractive index of each of the second sub-layers 22; and the thickness of each of the first sub-layers 21 is less than the thickness of each of the second sub-layers 22. Accordingly, the external light rays are refracted and scattered at the interfaces between the first sub-layers 21 and the second sub-layers 22, which reduces the probability that reflection happens, thereby the exiting amount of the reflected light rays is reduced, so that the display panel has an extremely low reflectivity, wherein the visible-light reflectivity of the display panel is less than or equal to 1.1%, thus an "extremely black" effect of displaying is realized.

The above are merely particular embodiments of the present application, and the protection scope of the present application is not limited thereto. All of the variations or substitutions that a person skilled in the art can easily envisage within the technical scope disclosed by the present application should fall within the protection scope of the present application. Therefore. the protection scope of the present application should be subject to the protection scope of the claims.

The invention claimed is:

1. A display panel, comprising:
a glass substrate, wherein the glass substrate is a substrate at a light exiting side of the display panel; and
a tandem layer located at a light exiting side of the glass substrate, wherein:
the tandem layer comprises one or more first sub-layers and one or more second sub-layers, and the first sub-layers and the second sub-layers are arranged alternately; a refractive index of each of the first sub-layers is greater than a refractive index of each of the second sub-layers; a thickness of each of the first sub-layers is less than a thickness of each of the second sub-layers;
a visible-light reflectivity of the display panel is less than or equal to 1.1%;
the display panel further comprises a light-transmitting conducting layer, and the light-transmitting conducting layer is located at one side of the tandem layer that is further from the glass substrate;
a refractive index of the light-transmitting conducting layer is greater than the refractive index of each of the second sub-layers, and the refractive index of the light-transmitting conducting layer is greater than the refractive index of the glass substrate;
the display panel further comprises a composite polarizing film, and the composite polarizing film is located at one side of the light-transmitting conducting layer that is further from the tandem layer;
the composite polarizing film comprises a polarizer and a low-reflection layer, and the low-reflection layer is located at one side of the polarizer that is further from the light-transmitting conducting layer;
a difference between a ratio of a refractive index of air to a refractive index of the low-reflection layer and a ratio of the refractive index of the low-reflection layer to a refractive index of the polarizer is less than or equal to 5% of the ratio of the refractive index of air to the refractive index of the low-reflection layer;
materials of the first sub-layers are silicon nitride and materials of the second sub-layers are silicon oxide;
thicknesses of the second sub-layers are equal;
a quantity of the first sub-layers and a quantity of the second sub-layers are equal, a quantity N of the first sub-layers is an even number, a first instance of the first sub-layers directly contacts the glass substrate, and an N-th instance of the second sub-layers directly contacts the light-transmitting conducting layer;

a thickness of the first instance of the first sub-layers is less than a thickness of each of the other instances of the first sub-layers; and an absolute value of a difference between two times a thickness of the first instance of the first sub-layers and a thickness of a second instance of the first sub-layers is less than or equal to 4 nm.

2. The display panel according to claim 1, wherein the refractive index of each of the first sub-layers is greater than the refractive index of the glass substrate, and the refractive index of each of the second sub-layers is less than the refractive index of the glass substrate.

3. The display panel according to claim 1, wherein a thickness of each of at least some of the first sub-layers is less than or equal to a thickness of the light-transmitting conducting layer.

4. The display panel according to claim 1, wherein a minimum distance from a surface of an (N/2)-th instance of the second sub-layers that is further from the glass substrate to the glass substrate is less than a distance from the surface of the (N/2)-th instance of the second sub-layers that is further from the glass substrate to the light-transmitting conducting layer.

5. The display panel according to claim 4, wherein the tandem layer comprises two instances of the first sub-layers and two instances of the second sub-layers.

6. The display panel according to claim 4, wherein an absolute value of a difference between a thickness of the first instance of the first sub-layers and a thickness of the light-transmitting conducting layer is less than or equal to 6 nm.

7. The display panel according to claim 1, wherein absolute values of differences between thicknesses of the second sub-layers are less than or equal to 12 nm.

8. The display panel according to claim 1, wherein a range of the refractive index of each of the first sub-layers is 1.8-2.2; a range of the refractive index of each of the second sub-layers is 1.4-1.6.

9. The display panel according to claim 1, wherein a range of a refractive index of the composite polarizing film is 1.2-1.4.

10. The display panel according to claim 1, wherein the display panel further comprises a color-resistor layer, the color-resistor layer is located at one side of the glass substrate that is further from the tandem layer, the color-resistor layer comprises a black matrix pattern, and a refractive index of the black matrix pattern is less than or equal to 1.7.

11. A display device, wherein the display device comprises the display panel according to claim 1.

12. The display device according to claim 11, wherein the refractive index of each of the first sub-layers is greater than the refractive index of the glass substrate, and the refractive index of each of the second sub-layers is less than the refractive index of the glass substrate.

13. The display device according to claim 11, wherein a thickness of each of at least some of the first sub-layers is less than or equal to a thickness of the light-transmitting conducting layer.

14. The display device according to claim 11, wherein thicknesses of the second sub-layers are equal.

* * * * *